No. 80,669. W. W. ROGERS. PATENTED AUG. 4, 1868.
DUMPING CART AND WAGON.

Witnesses.
Wm. A. Morgan
G. C. Cotton

Inventor.
Wm. W. Rogers
per Munn
Attorneys

United States Patent Office.

WILLIAM W. ROGERS, OF HAMPDEN CORNER, MAINE.

Letters Patent No. 80,669, dated August 4, 1868.

IMPROVEMENT IN DUMPING CARTS AND WAGONS.

The Schedule referred to in these Letters Patent and making part of the same.

TO ALL WHOM IT MAY CONCERN:

Be it known that I, WILLIAM W. ROGERS, of Hampden Corner, in the county of Penobscot, and State of Maine, have invented a new and useful Improvement in Dumping Carts and Wagons; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved device, by means of which the tail-boards of dumping-carts and wagons may be made self-operating, that is to say, so that the tail-board will be raised automatically, as the cart or wagon-body is tipped up to dump the load, and will drop back into place and fasten itself, as the said body is again raised into a horizontal position.

It consists in the construction and combination of parts, by means of which the tail-board of the cart or wagon is operated automatically, as the body of said cart or wagon is tipped up to dump the load as hereinafter more fully described.

A are the wheels, B is the axle, C are the shafts, and D is the body of the cart, about the construction of which parts there is nothing new.

E is the tail-board, which is hinged to a strong bar or rod, F, passing through and secured to the upper projecting ends of the rear posts of the cart-body, or which is secured to other substantial supports.

Figure 1:
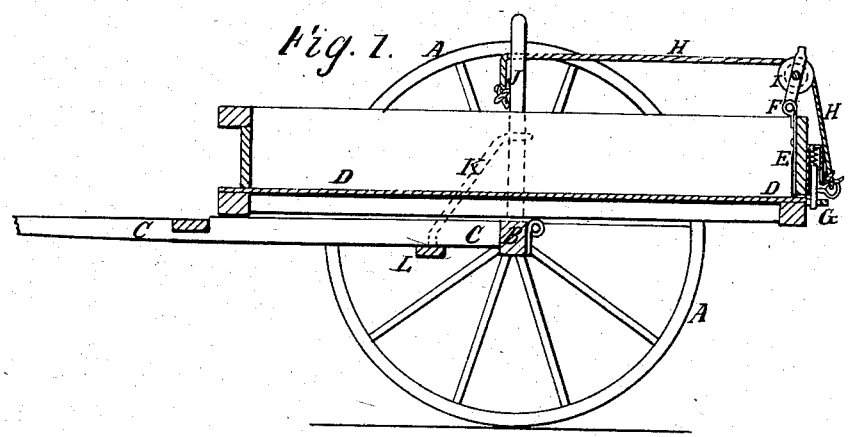
Figure 1 is a vertical longitudinal section of a cart to which my improvement has been attached.
Figure 2:
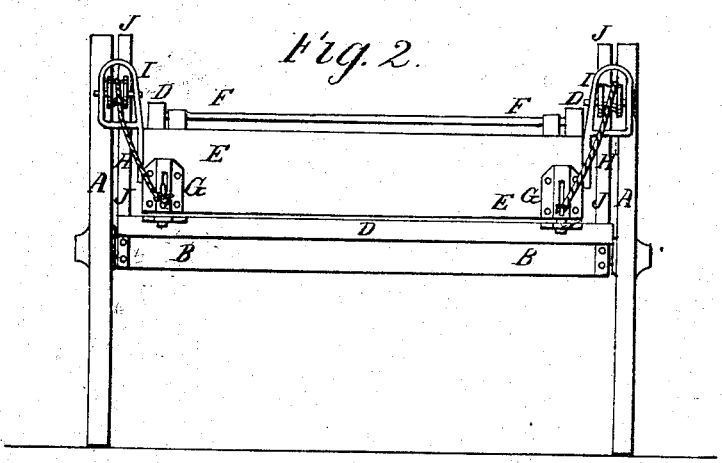
Figure 2 is a rear view of the same.

To the lower part of the tail-board E, near its ends, are attached spring-bolts G, consisting of a bolt placed in a case or cap, and held out by a coiled spring placed in said case, and pressing against the upper end of said bolt, as shown in fig. 1. The inner sides of the lower ends of the bolts are bevelled off, so that, as the tail-board E drops into place, the said bolts may be pushed back by striking against catches attached to the rear end of the bottom of the body D of the cart, causing the said tail-board to fasten itself.

To the spring-bolts G are attached eye-bolts or staples, which pass out through slots in the rear side of the bolt-cap, and to which are attached the ends of the cords or chains H.

The cords or chains H pass over pulleys I, secured to the upper rear corner of the sides of the body D, and their other ends are attached to the upper parts of the stakes J, as shown in fig. 1.

By this arrangement, as the cart-body is tipped up to dump the load, the cords or chains H, as the rear end or tail of the cart-body D descends, draw up the spring-bolts G from their catches into their caps, unfastening the tail-boards, and, as the rear end of the body D continues to descend, the cords or chains H hold the said tail-board suspended and out of the way.

As the body D is again raised into a horizontal position, the cords or chains H are slackened, allowing the tail-board E to drop down to its place, fastening itself.

The stakes J are strengthened against the draught-strain of the cords or chains H, by the brace-rods K, the upper ends of which are secured to the said stakes J, and the lower ends of which are secured to the ends of the cross-bar L, placed beneath and secured to the rear parts of the shafts C', as shown in dotted lines in fig. 1.

Having thus described my invention, I claim as new, and desire to secure by Letters Patent—

1. The combination of the spring-bolts G, cords or chains H, and pulleys I, with the hinged tail-board E, stakes J, and body D of the cart or wagon, substantially as herein shown and described, and for the purpose set forth.

2. The combination of the brace-rods K and cross-bar L with the stakes J and shafts C, substantially as herein shown and described, and for the purpose set forth.

WILLIAM W. ROGERS.

Witnesses:
A. K. ALLEN,
HIRAM SYLVESTER.